US008826886B2

(12) United States Patent
Nishida et al.

(10) Patent No.: US 8,826,886 B2
(45) Date of Patent: Sep. 9, 2014

(54) ENGINE IGNITION TIMING SETTING APPARATUS

(75) Inventors: Kenji Nishida, Saitama (JP); Tetsuya Kaneko, Saitama (JP); Tomiyuki Sasaki, Saitama (JP); Shinichi Wagatsuma, Saitama (JP); Naoki Sakamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 386 days.

(21) Appl. No.: 13/408,198

(22) Filed: Feb. 29, 2012

(65) Prior Publication Data

US 2012/0234292 A1 Sep. 20, 2012

(30) Foreign Application Priority Data

Mar. 16, 2011 (JP) ................... 2011-057873

(51) Int. Cl.
*F02P 5/00* (2006.01)
*F02D 35/02* (2006.01)
*F02P 5/15* (2006.01)
*F02D 41/00* (2006.01)

(52) U.S. Cl.
CPC ...... *F02D 41/0097* (2013.01); *F02D 2200/021* (2013.01); *F02D 35/024* (2013.01); *Y02T 10/46* (2013.01); *F02P 5/1502* (2013.01); *F02D 2200/1012* (2013.01)
USPC ............ 123/406.23; 123/406.41; 123/406.55; 123/406.58; 701/110; 701/111

(58) Field of Classification Search
USPC .......... 123/435, 436, 406.23, 406.41, 406.43, 123/406.55, 406.58; 701/103, 110, 111; 73/35.07, 35.12, 114.62
See application file for complete search history.

(56) References Cited

U.S. PATENT DOCUMENTS 7,437,233 B2   10/2008   Yasui et al.
7,621,260 B2   11/2009   Mitani et al.

FOREIGN PATENT DOCUMENTS

| CN | 1878951 A | 12/2006 | |
|---|---|---|---|
| CN | 101037971 A | 9/2007 | |
| CN | 101133238 A | 2/2008 | |
| EP | 1 835 154 A1 | 9/2007 | |
| JP | 04-060151 A | 2/1992 | |
| JP | 2012-193655 | * 10/2012 | ............... F02P 5/15 |

* cited by examiner

*Primary Examiner* — Hai Huynh
(74) *Attorney, Agent, or Firm* — Carrier Blackman & Associates, P.C.; Joseph P. Carrier; William D. Blackman

(57) ABSTRACT

An ignition timing setting apparatus includes a pulse generator for generating crank pulses corresponding to crank angles, a crank angular speed variation calculating section for calculating a crank angular speed variation based on an interval of the crank pulses, an engine load estimating section for estimating an indicated mean effective pressure from the crank angular speed variation, and an ignition timing determining section having an ignition timing control map for determining an ignition timing advance quantity in accordance with the estimated indicated mean effective pressure and an engine temperature or an engine speed. Such ignition timing setting apparatus sets appropriate ignition timings for avoiding a knocking occurrence load range based on an accurate estimated engine load.

20 Claims, 9 Drawing Sheets

ENGINE IGNITION TIMING SETTING APPARATUS

CROSS-REFERENCE TO RELATED APPLICATIONS

The present invention claims priority under 35 USC 119 based on Japanese patent application No. 2011-057873, filed on Mar. 16, 2011. The entire subject matter of this priority document, including specification claims and drawings thereof, is incorporated by reference herein.

BACKGROUND OF THE INVENTION

1. Field of the Invention

The present invention relates to an ignition timing setting apparatus. More particularly, the present invention relates to an engine ignition timing setting apparatus which is capable of verifying a knocking occurrence limit precisely and setting ignition timing to an advance quantity to maintain higher engine efficiency while avoiding occurrence of knocking.

2. Description of the Background Art

There is a known gasoline engine for a transportation apparatus which is preferably operated at an optimal ignition timing at all times in order to improve fuel economy and to reduce exhaust emission. In such known engine, when a compression ratio is increased for the purpose of improving thermal efficiency, knocking occurs. In recent years, in an automotive engine, a precise ignition timing control has been performed to avoid occurrence of knocking by installing a knock sensor in each cylinder. However, since such a sensing system was expensive, the sensing system could not be widely adopted in gasoline engines for vehicles.

The Japanese patent document JP-A No. H4-60151 proposes an engine load detecting apparatus that detects a load of an engine from rotational fluctuation of a crankshaft and includes a technology that advances or delays ignition timing according to the detected load. In such engine load detecting apparatus, the magnitude of intake air volume is regarded as magnitude of an engine load. Specifically, the magnitude of the intake air volume is determined according to the rotational fluctuation of the crankshaft without using a vacuum sensor of an intake pipe or a throttle opening sensor. Accordingly, without depending on an expensive sensing system, since the ignition timing can advance up to a knocking occurrence limit depending on the load when the load decreases, it can be expected that an engine is operated at an appropriate ignition timing.

However, a load of an engine may not be proportionate to intake air volume according to a difference in an air-fuel ratio or ignition timing. Therefore, in terms of the correlation between the engine load and the intake air volume, in the load detecting apparatus disclosed in the Japanese Patent document JP-A No. H4-60151, it is difficult to verify the knocking occurrence limit precisely and further to advance the ignition timing.

Accordingly, it is one of the objects of the present invention is to provide an engine ignition timing setting apparatus capable of setting an appropriate ignition timing while avoiding a knocking range by verifying the knocking occurrence range precisely.

SUMMARY OF THE INVENTION

In order to achieve the above objects, the present invention according to a first aspect thereof provides an ignition timing setting apparatus, which includes: a pulse generator for generating a crank pulse corresponding to a crank angle of an engine; a crank angular speed variation calculating section for calculating a crank angular speed variation based on an interval of the crank pulse; an engine load estimating section for estimating an indicated mean effective pressure from the crank angular speed variation; and an ignition timing determining section for determining an ignition advance quantity in accordance with the estimated indicated mean effective pressure and a state of the engine.

The present invention according second aspect thereof, in addition to the first aspect, further includes an engine temperature sensor for sending engine temperature, and is characterized in that the ignition timing determining section is configured to receive engine temperatures sensed by the engine temperature sensor, and to have an ignition timing control map set for each engine temperature in order to search ignition timing based on the engine speed as the state of the engine and the estimated indicated mean effective pressure for respective sensed engine temperature.

The present invention according to a third aspect thereof, in addition to one of the first and second aspects, is characterized in that the crank angular speed variation calculating section is configured to calculate a first crank angular speed based on a crank pulse around a compression top dead center of the engine, to calculate a second crank angular speed based on a crank pulse around an expansion bottom dead center of the engine, and to calculate the crank angular speed variation by subtracting the first crank angular speed from the second crank angular speed.

The present invention according to a fourth aspect thereof, in addition to the third aspect, is characterized in that the engine load estimating section is configured to estimate an indicated mean effective pressure dealing with only an indicated positive work generated from a compression stroke to an expansion stroke, as the engine load.

The present invention according to a fifth aspect thereof, in addition to one of the first and second aspects, is characterized in that the pulse generator detects a reluctor that protrudes in an outer circumferential direction from a rotor that rotates in synchronization with a crankshaft to generate the crank pulse, and that the crank angular speed variation calculating section is configured to calculate a first crank angular speed based on the crank pulse around the compression top dead center of the engine, to calculate a second crank angular speed around an overlap top dead center based on a crank pulse outputted with respect to the reluctor used for calculating the first crank angular speed, and to calculate the crank angular speed variation by subtracting the first crank angular speed from the second crank angular speed.

The present invention according to a sixth aspect thereof, in addition to the fifth aspect, is characterized in that the engine load estimating section is operable to estimate an indicated mean effective pressure dealing with an indicated work throughout one cycle, as the engine load.

The present invention according to the seventh aspect thereof, in addition to the second aspect, is characterized in that the ignition timing control map is set to search the ignition timing from an engine load rate acquired by dividing the estimated indicated mean effective pressure by a predetermined indicated mean effective pressure at a full load and the engine speed.

Advantageous Effects of the Invention

According to the first to seventh aspects of the present invention, an indicated mean effective pressure as an engine load is estimated from a crank angular speed variation, and the load is estimated precisely by using the estimated indicated mean effective pressure to determine ignition timing. As a result, appropriate ignition timings can be set while avoiding a knocking occurrence load range.

According to the second aspect of the present invention, since a plurality of ignition timing control maps for determining the ignition timing by using engine speed and the estimated engine load are established, the knocking occurrence load range can be judged more accurately.

According to the fifth aspect of the present invention, even when there are variations in the width or arrangement interval of a reluctor within a production tolerance range, the appropriate ignition timing can be set by preventing load estimating precision from being deteriorated due to the variations.

According to the seventh aspect of the present invention, the ignition timings can be appropriately set according to variations of a proportional constant to the indicated mean effective pressure by the engine speed by using a non-dimensionalized load rate.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Figure 1:
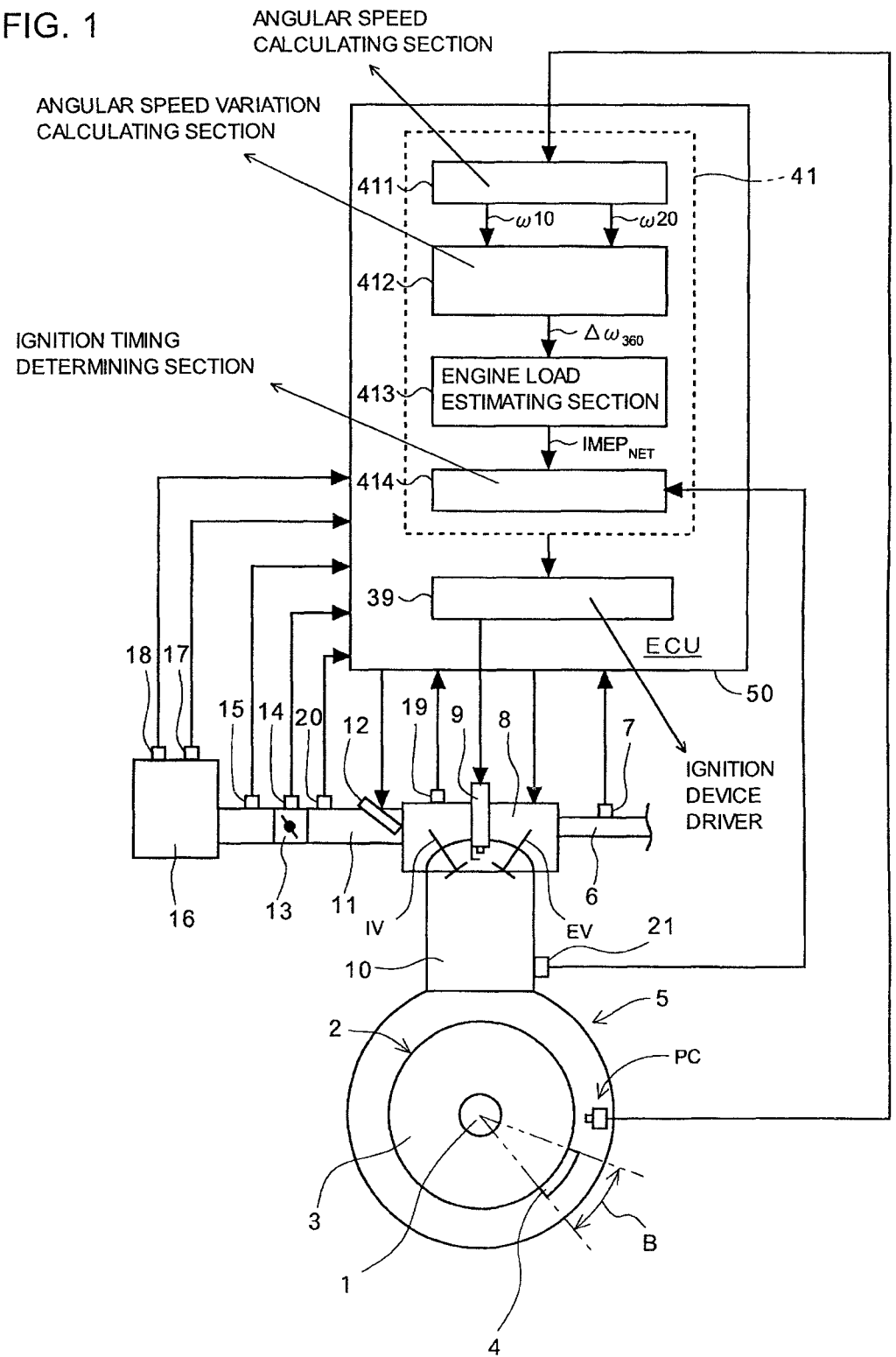
FIG. 1 is a block diagram showing a system configuration of an engine control apparatus including an ignition timing setting apparatus according to an illustrative embodiment of the present invention.

Hereinafter, illustrative embodiments of the present invention will be described in detail with reference to the accompanying drawings. FIG. 1 is a block diagram showing a system configuration of an engine control apparatus including an ignition timing setting apparatus according to an illustrative embodiment of the present invention.

Referring to FIG. 1, a cylinder head 8 is mounted on the top of a cylinder 10 of a 4-cycle single-cylinder engine 5. The engine 5 may have a variable valve timing (VVT) mechanism. The VVT mechanism moves a control motor (not shown) based a drive command from an ECU 50. As a result, the valve timing of each of an intake valve IV and an exhaust valve EV is changed. With the change of the valve timing, a valve lift is also changed. A variable state of the valve timing by the VVT mechanism is transferred to the ECU 50 by a sensor 19 sensing the rotational angle of the control motor.

A crank pulser rotor 2 is mounted on a crankshaft 1 of the engine 5. The crank pulser rotor 2 includes a rotor 3 that rotates in synchronization with the crankshaft 1 and a reluctor 4 that protrudes in an outer peripheral direction from the rotor 3. The reluctor 4 has a width B (e.g., 30°) which is in a predetermined angle range in the circumferential direction of the rotor 3.

A magnetic pick-up type pulse generator PC is installed at a position opposite to the outer circumference of the rotor 3. The pulse generator PC outputs an on signal at a position with the reluctor 4 and outputs an off signal at a position without the reluctor 4. That is, a rotation-direction front end of the reluctor 4 is sensed by the on signal of the pulse generator PC and a rotation-direction rear end thereof is sensed by the off signal. The sensed signal, i.e., a crank pulse is inputted into the ECU 50. The crank pulser rotor 2 is mounted at a position on the crankshaft 1 so that the reluctor 4 is positioned around a top dead center.

Figure 2:
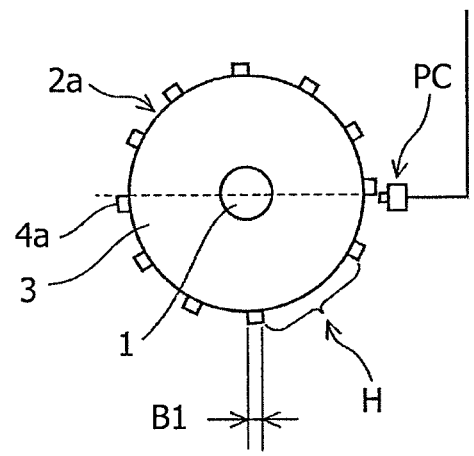
FIG. 2 is a front view showing one example of a crank pulser rotor having a plurality of reluctors.

Further, the crank pulser rotor 2 may have a plurality of reluctors. FIG. 2 is a front view of the crank pulser rotor having the plurality of reluctors.

As shown in FIG. 2, a crank pulser rotor 2a is mounted on the crankshaft 1. The crank pulser rotor 2a rotates in synchronization with the crankshaft 1. A plurality of reluctors 4a are arranged on the outer circumference of a rotor 3a at regular intervals (for example, an interval of 30°) except for one untoothed part or tooth-lack part (a part without the reluctor 4a) H. The pulse generator PC inputs sensed signals of front and rear ends of the reluctor 4a into the ECU 50. When the crank pulser rotor 2a, shown in FIG. 2 is used, only one side of the crank pulse outputted to correspond to the front and rear ends sensed by the pulse generator PC is used. As a result, the width B1 of the reluctor 4a of FIG. 2 may be smaller than the width B of the reluctor 4 shown in FIG. 1.

Referring back to FIG. 1, an air cleaner box 16 that filters intake air is mounted at one end portion of the intake pipe 11. An intake temperature sensor 17 and an atmospheric pressure sensor 18 are installed in the air cleaner box 16. Further, an airflow sensor 15 measuring intake air volume, a throttle valve opening sensor 14 sensing the rotational angle of the throttle valve 13, and an intake pressure sensor 20 sensing intake pressure are each mounted in the intake pipe 11.

Further, a temperature sensor 21 sensing the temperature of the engine 5 is installed in the cylinder 10. An ignition device 9 is installed on the top of a combustion chamber. A fuel injection valve 12 is installed in the intake pipe 11 at the downstream side of the throttle valve 13. An oxygen concentration sensor 7 is mounted on an exhaust pipe 6. For example, a piezoelectric element type cylinder pressure sensor may be installed in the ignition device 9.

The ECU 50 includes an ignition controller 41 and an ignition device driver 39. The ignition controller 41 is also referred as ignition timing setting apparatus 41. The ignition controller 41 includes an angular speed calculating section 411, an angular speed variation calculating section 412, an engine load estimating section 413, and an ignition timing determining section 414.

The angular speed calculating section 411 calculates a first crank angular speed $\omega 10$ at a compression top dead center of the engine 5 and a second crank angular speed $\omega 20$ at a position where the crankshaft 1 rotates at 360° (i.e., one turn) from the compression top dead center, i.e., an overlap top dead center, based on the length of time when the inputted sensed signal of the pulse generator PC is on.

The angular speed variation calculating section 412 calculates the difference between the first crank angular speed $\omega 10$ and the second crank angular speed $\omega 20$, i.e., a crank angular speed variation ($\Delta \omega_{360}$).

The engine load estimating section 413 estimates an indicated mean effective pressure ($IMEP_{NET}$) based on the crank angular speed variation ($\Delta \omega_{360}$).

The ignition timing determining section 414 determines the ignition timing (advance quantity) by searching a map using as parameters the estimated indicated mean effective pressure ($IMEP_{NET}$) and the state of the engine, e.g., at least engine speed and engine temperature. The determined ignition timing is inputted into the ignition device driver 39 and the ignition device driver 39 provides an ignition signal to the ignition device 9 at an ignition timing according to a command of the inputted ignition timing.

The ignition controller 41 and the ignition device driver 39 can be implemented by a program of a micro-computer. The ECU 50 includes the micro-computer that executes the program. As described above, the ECU 50 has a function of controlling the ignition timing based on the crank angular speed variation ($\Delta \omega_{360}$) and performing the control to suppress the rotation variation of the engine.

A reason for determining the ignition timing based on the load will be described.

Figure 3:
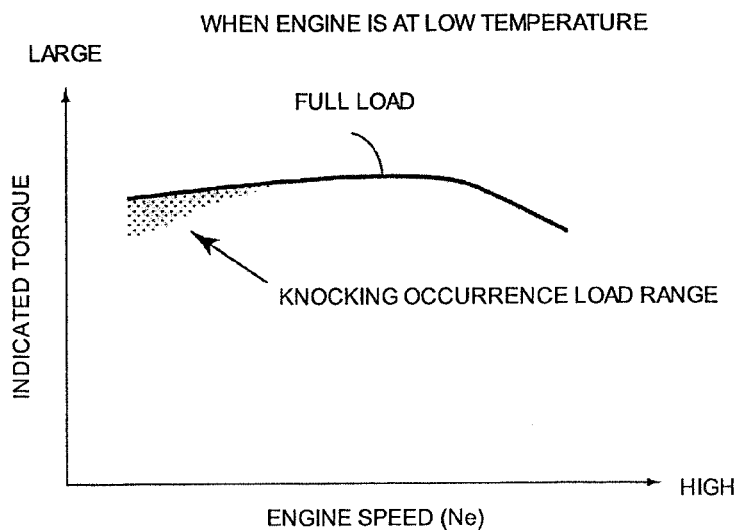
FIG. 3 is a diagram showing a knocking occurrence load range when an engine is at low temperature as the relationship between engine speed and indicated torque indicating a load.
Figure 4:
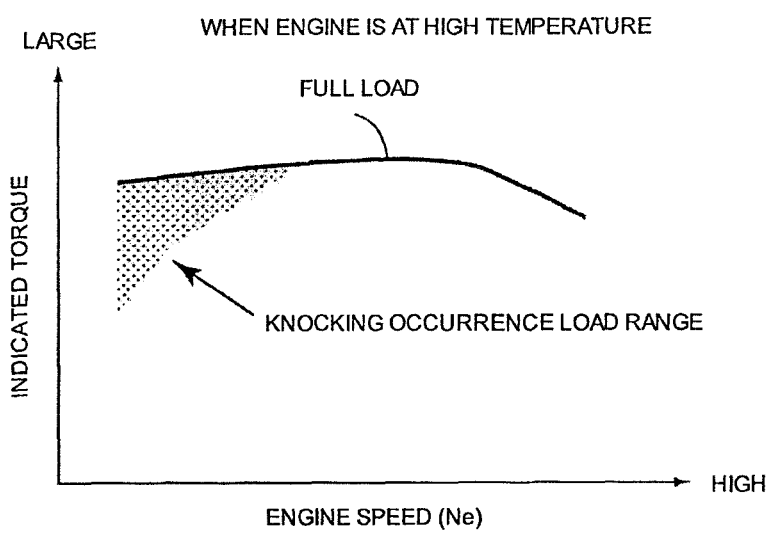
FIG. 4 is a diagram showing the knocking occurrence load range when the engine is at high temperature as the relationship between the engine speed and the indicated torque indicating the load.

FIGS. 3 and 4 are diagrams showing a knocking occurrence load range as the relationship between the engine speed Ne and an indicated torque indicating the load. In this case, as the ignition timing, an optimal ignition timing (MBT) is indicated. FIG. 3 shows the relationship when the engine is at a relatively low temperature just after a star-up. FIG. 4 shows an example when the engine is at a relatively high temperature.

As shown in FIG. 3, even in the case where the engine speed Ne is low when the engine is at the low temperature, the knocking occurrence load range represents that the indicated torque is in a narrow range around a full load. As a result, knocking is difficult to occur in the entire range.

Meanwhile, as shown in FIG. 4, in the case where the engine speed Ne is low when the engine is at the high temperature, the knocking occurrence range represents that the indicated torque extends up to a half range of the full load, and knocking is easy to occur even in the low revolution speed and a low load when the engine is at the high temperature. Therefore, if there are means for detecting the load and the engine temperature, the knocking occurrence load range can be estimated and ignition timing for avoiding the knocking occurrence load range can be determined. Further, when the indicated torque indicating the load is generalized irrespective of a displacement, the torque becomes the indicated mean effective pressure.

Figure 5:
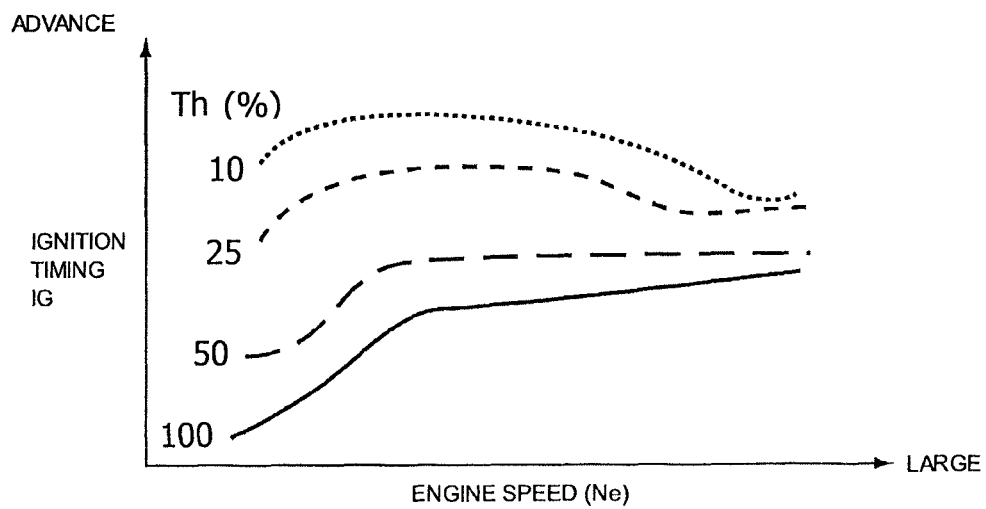
FIG. 5 is a diagram showing an example of an ignition timing search map in the related art.

In the related art, as the means for detecting the load, a method of using a throttle opening Th associated with volumetric efficiency is adopted. FIG. 5 is a diagram showing an example of an ignition timing search map in the related art. The map in the related art uses the throttle opening Th and is set to determine the ignition timing (advance quantity) IG by using the engine speed Ne and the throttle opening Th as parameters. As seen from FIG. 5, at the same engine speed, as the throttle opening Th as the load increases, a large advance quantity can be applied.

However, when the load is represented by the throttle opening Th, a problem described below occurs.

Although the throttle opening Th is associated with the volumetric efficiency, the mass of air that is actually sucked into the engine is changed by air density. As a result, the indicated mean effective pressure is changed depending on atmospheric conditions (temperature, atmospheric pressure, humidity, and the like) even under the same throttle opening Th.

Figure 6:
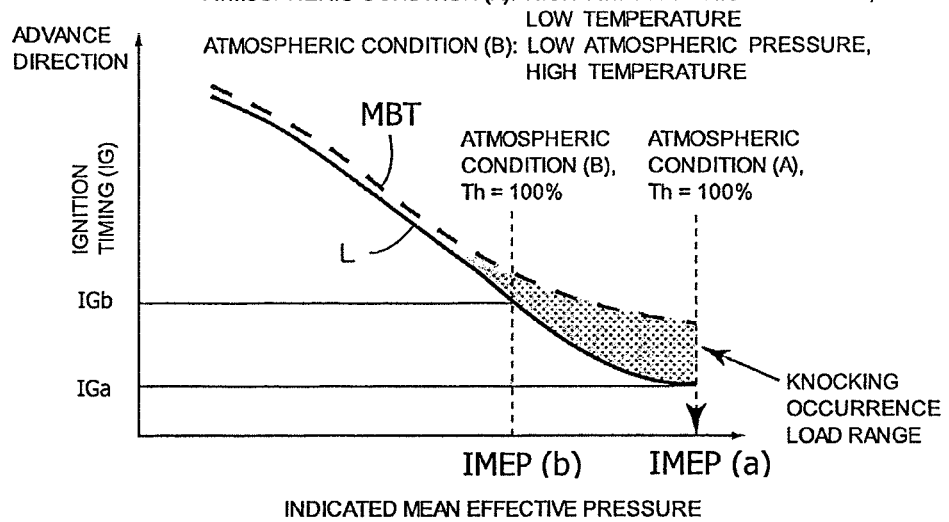
FIG. 6 is a diagram showing the relationship between an indicated mean effective pressure under each atmospheric condition and the knocking occurrence load range.

FIG. 6 is a diagram showing the relationship between an indicated mean effective pressure under each atmospheric condition and the knocking occurrence load range. The line MBT is an optimal ignition timing when the engine speed and the engine temperature are constant. As shown in FIG. 6, even under the same condition where the throttle opening Th is 100% (at full throttle), the indicated mean effective pressure IMEP(b) under an atmospheric condition (B), e.g., low atmospheric pressure and high temperature is lower than the indicated mean effective pressure IMEP(a) under an atmospheric condition (A), e.g., high atmospheric pressure and low temperature.

As described above, under the atmospheric pressure condition (B) having the indicated mean effective pressure IMEP (b) at full throttle, although an ignition timing that advances approximately up to the optimal ignition timing (MBT) is given, the knocking occurrence load range can be substantially avoided. The ignition timing is preferably set as the line L along the optimal ignition timing MBT while avoiding the knocking occurrence load range. When the ignition timing is set as above, ignition timing IGa and IGb are acquired with respect to the indicated mean effective pressures IMEP(a) and IMEP (b), respectively. That is, the advance quantity depending on the load state can be selected under each of the atmospheric conditions indicated as the indicated mean effective pressures IMEP(a) and IMEP(b).

However, in the related art, since the load is estimated based on the throttle opening Th, the ignition timing IG is fixed if the throttle opening Th is constant. For example, under the atmospheric condition (A), IGa is given as the ignition timing IG by avoiding the knocking occurrence load range, and the ignition timing IGa is maintained even when the atmospheric condition (A) is changed to the atmospheric condition (B) as long as the throttle opening Th is not changed.

However, under the atmospheric condition (B), as indicated by the indicated mean effective pressure IMEP(b), the load actually decreases. As a result, the ignition timing IG can advance up to the ignition timing IGb. Since the ignition timing IGa is controlled to be delayed significantly as compared with the ignition timing IGb, combustion efficiency deteriorates.

Therefore, when the ignition timing can be determined according to the indicated mean effective pressure IMEP, the ignition timing is not influenced by the atmospheric condition. Accordingly, ignition control can be performed at the ignition timing IG much closer to the optimal ignition timing MBT while avoiding knocking occurrence as compared with the ignition timing control according to the throttle opening Th.

Now, the relationship between the variation of the crank angular speed and the indicated mean effective pressure IMEP will be described.

Figure 7:
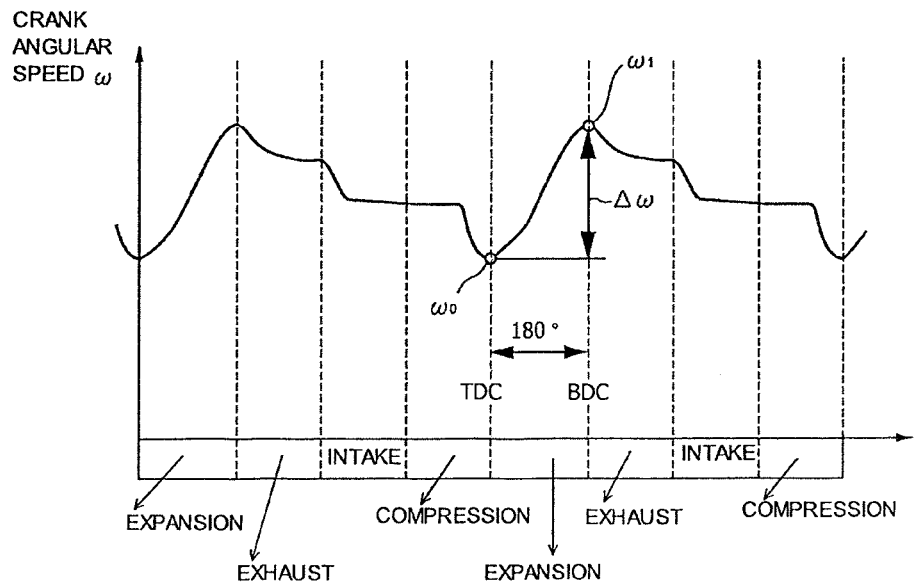
FIG. 7 is a time chart showing the relationship between a crank pulse and a variation in a crank angular speed co in one cycle.

FIG. 7 is a time chart showing the relationship between a crank pulse and a variation in a crank angular speed co in one cycle.

As shown in FIG. 7, the angular speed ω of the crankshaft 1 is caused by a variation torque of the crankshaft and is varied periodically by one cycle of the engine, i.e., four strokes of compression, expansion, exhaust, and intake, based on the mean revolution speed Ne. A minimum angular speed ω0 is shown around the compression top dead center TDC and a maximum angular speed ω1 is shown when the expansion stroke is terminated, i.e., around an exhaust top dead center BDC (a crank angle of 150° to 180°).

Specifically, the crank angular speed co is reduced due to compression resistance by the increase of the internal pressure of the cylinder in the compression stroke. Meanwhile, in the expansion stroke, crank rotating energy is generated by the increase of the internal pressure of the cylinder caused by combustion. As a result, the crank angular speed ω increases. The crank angular speed ω decreased up to the minimum value ω0 in the compression stroke reaches the maximum crank angular speed ω1 just before the expansion stroke is terminated. Thereafter, the crank angle ω is continuously deteriorated by pump works such as mechanical friction resistance in the engine, discharge resistance of burnt gas in the exhaust stroke, and intake resistance in the intake stroke, and the engine reaches the intake stroke and compression stroke again.

According to the variation of the crank angular speed ω, the minimum crank angular speed ω0 sensed around the compression top dead center TDC is smaller than the mean engine speed Ne. Meanwhile, the maximum crank angular speed ω1 sensed just before the expansion stroke is terminated (the expansion bottom dead center BDC) is larger than the mean engine speed Ne. The difference Δω between the minimum crank angular speed ω0 and the maximum crank angular speed ω1 represents the load for the engine 5, as described herein.

An increase amount ΔE (joule) of the rotating energy in the expansion stroke is acquired by Equation 1 shown below.

$$\Delta E = \tfrac{1}{2} \times Ie \times (\omega 1^2 - \omega 0^2) \quad \text{(Equation 1)}$$

where, Ie represents a crankshaft inertia moment (kg·m²).

When the energy increasing amount ΔE is a work by the combustion of the engine, the energy increasing amount is acquired even by Equation 2 shown below.

$$\Delta E = IMEP \times Vs \quad \text{Equation 2}$$

where, IMEP represents the indicated mean effective pressure, and

Vs represents the displacement of the engine.

Further, the right side of Equation 1 can be converted into Equation 3 shown below.

$$\tfrac{1}{2} \times (\omega 1^2 - \omega 0^2) = (\omega 1 - \omega 0) \times \tfrac{1}{2} \times (\omega 1 + \omega 0) \quad \text{Equation 3}$$

The variation Δω of the crank angular speed in an expansion stroke section is defined by ω1−ω0. Further, since the right side of Equation 3 substantially coincides with the cycle mean angular speed ω, i.e., the revolution speed Ne, the right side of Equation 3 may be approximate to Equation 4 shown below.

$$\tfrac{1}{2} \times (\omega 1 + \omega 0) = Ne \quad \text{Equation 4}$$

The unit of the engine speed is rad/sec. From Equations 1 to 4, the variation Δω of the crank angular speed is expressed by Equation 5 shown below.

$$\Delta \omega = (IMEP \times Vs)/(Ie \times Ne) \quad \text{Equation 5}$$

That is, the crank angular speed Δω is proportionate to the indicated mean effective pressure IMEP and the displacement Vs and inversely proportionate to the engine speed Ne and the crankshafting inertia moment.

The engine load estimating section 413 of the ignition controller 41 has function of calculating the indicated mean effective pressure IMEP representing the load from the variation Δω of the crank angular speed according to Equation 5.

As described above, the load of the engine, i.e., the energy increasing amount ΔE is represented by the variation Δω of the crank angular speed, but there are various variation factors such as processing precision of the reluctor or mounting precision of the pulse generator PC in measuring actual equipment. Therefore, the variation Δω of the crank angular speed is acquired by using the same reluctor in order to exclude influences of the variation factors.

That is, the minimum crank angular speed ω0 is substituted with a first crank angular speed ω10 detected around the compression top dead center TDC, while the maximum crank angle ω1 is substituted with a second crank angular speed ω20 detected around the overlap top dead center OLP which is the position where the crankshaft rotates at 360° from the compression top dead center TDC. As a result, the variation Δω of the crank angular speed is defined by an increase amount from the first crank angular speed ω10 to the second crank angular speed ω20, i.e., the crank angular speed variation $\Delta \omega_{360}$ at the crank angle of 360° throughout the expansion stroke and the exhaust stroke.

Figure 8:
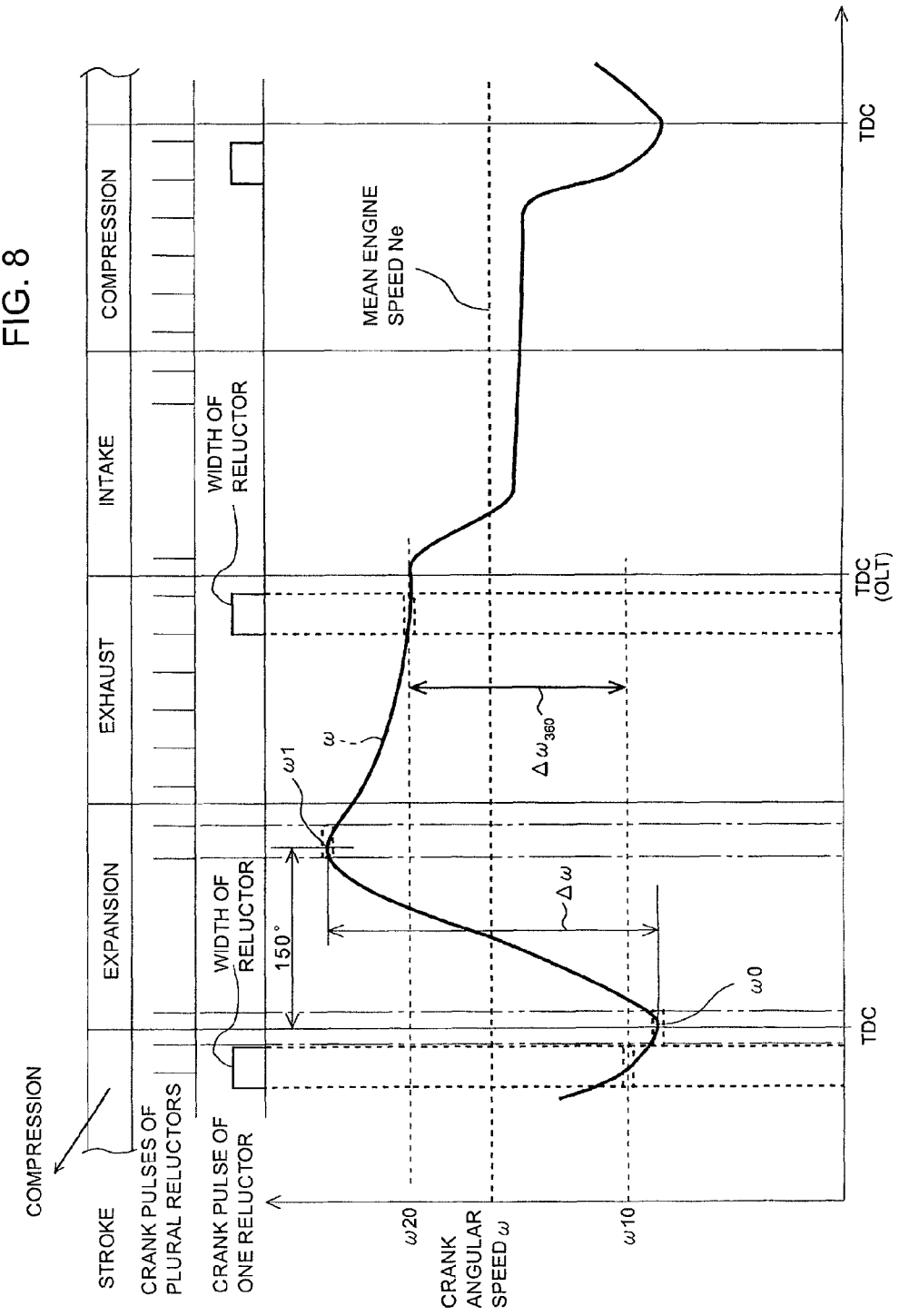
FIG. 8 is a time chart showing the relationship between the crank pulse and the variation in the crank angular speed co associated with a single reluctor.

FIG. 8 is a time chart showing the relationship between the crank pulse of the crank pulser rotor 2 having the single reluctor 4 and the variation in the crank angular speed ω. The crank angular speed ω has the minimum value ω0 around a start position of the expansion stroke, i.e., the compression top dead center TDC and the maximum value ω1 just before the expansion stroke is terminated (approximately a position at 150° from the TDC).

In addition, the crank angular speed ω decreases slowly in the exhaust stroke and further, decreases rapidly just after the entrance of the intake stroke. Thereafter, the crank angular speed ω up to the middle of the compression stroke is substantially maintained to a value lower than the mean revolution speed of the engine and decreases toward the minimum value ω0 from a latter half of the compression stroke.

In the example shown in FIG. 8, the position of the crank pulser rotor 2 is set so that the crank pulse corresponding to the rear end among the crank pulses outputted from the pulse generator PC corresponds to a position just before the compression top dead center TDC (e.g., before the compression TDC by 10°) by sensing the front and rear end of the reluctor 4. Therefore, the crank pulse is generated just before the compression top dead center TDC and also generated after one turn of the engine, i.e., just before the overlap top dead center OLP. In addition, the width of the crank pulse at each position is detected as the crank angular speed ω at the corresponding position, i.e., the first crank angular speed ω10 and the second crank angular speed ω20 and the increase amount $\Delta\omega_{360}$ thereof is calculated as the crank angle variation.

Meanwhile, in FIG. 8, in addition to the crank pulse corresponding to one reluctor 4, a crank angular speed detecting position in the related art, which uses the crank pulse of the crank pulser rotor 2*a* having the plurality of reluctors 4*a* shown in FIG. 2, is shown. In the related art, the crank angular speed variation Δω is acquired by the minimum crank angular speed ω0 and the maximum crank angular speed ω1 based on two crank pulses throughout the compression top dead center TDC and two crank pulses at the position at 150° from the compression top dead center TDC, by using the crank pulser rotor 2*a*. That is, the crank pulses by the different reluctors are used.

Figure 9:
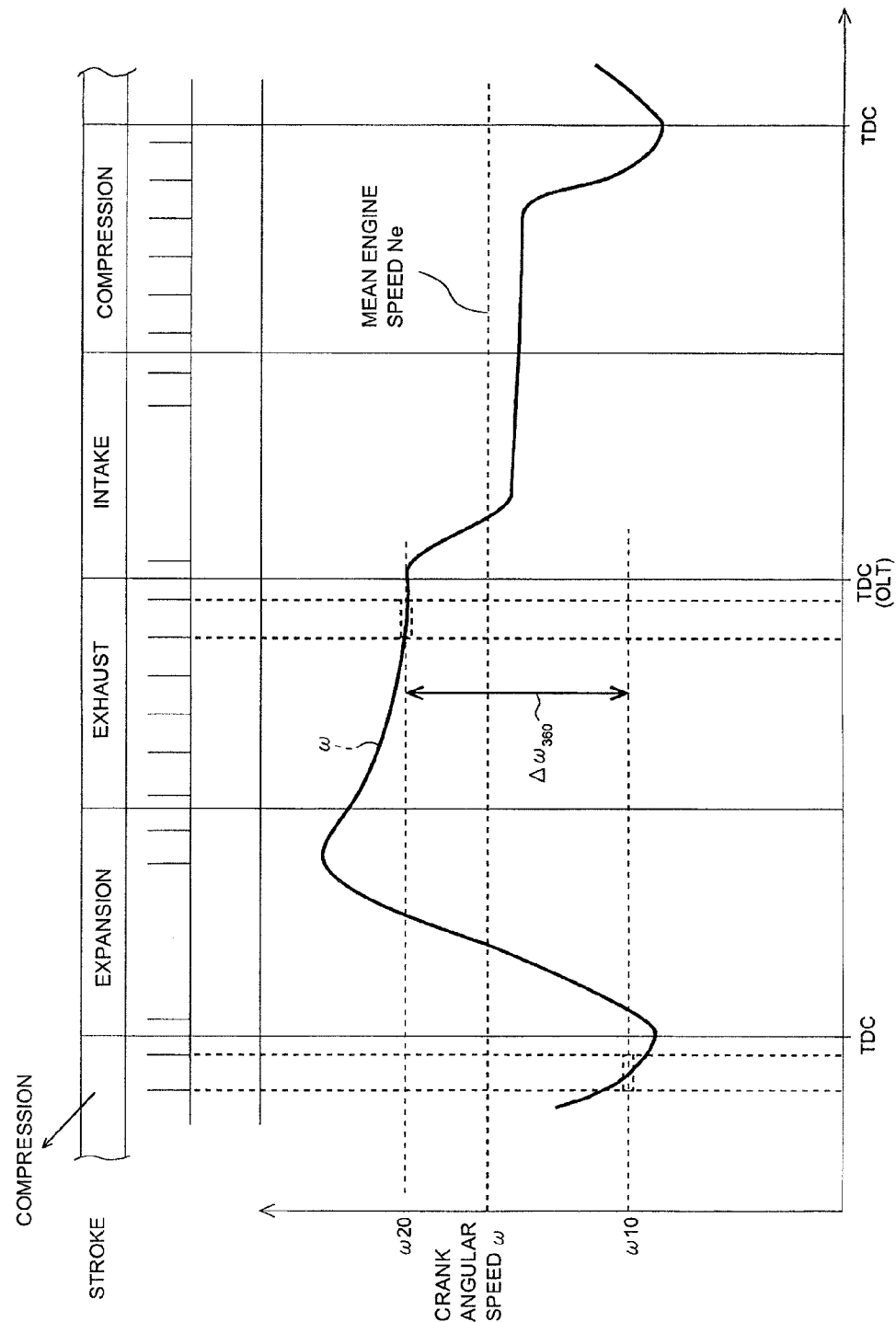
FIG. 9 is a time chart showing the relationship between the crank pulse and the variation in the crank angular speed co associated with a plurality of reluctors.

FIG. 9 is a time chart showing the relationship between the crank pulse of the crank pulser rotor 2*a* having the plurality of reluctors 4*a* and the variation in the crank angular speed ω. As shown in FIG. 9, the first crank angular speed ω10 and the second crank angular speed ω20 are acquired by using the crank pulses from two reluctors 4*a* acquired at the position just before the compression top dead center TDC and just before the overlap top dead center OLT, among the plurality of reluctors 4*a*, respectively.

In this example, since two reluctors among the plurality of reluctors 4*a* are commonly used to detect the first crank angular speed ω10 and the second crank angular speed ω20, the influence by a size variation within a production tolerance range can be excluded similarly to the case of using the crank pulser rotor 2 having the single reluctor 4.

Further, when the crank angular velocities ω10 and ω20 are acquired around the compression top dead center TDC or around the overlap top dead center OLT, the position of the crank pulser rotor 2*a* may be set so that two crank pulses extend over the compression top dead center TDC or the overlap top dead center OLT.

Figure 10:
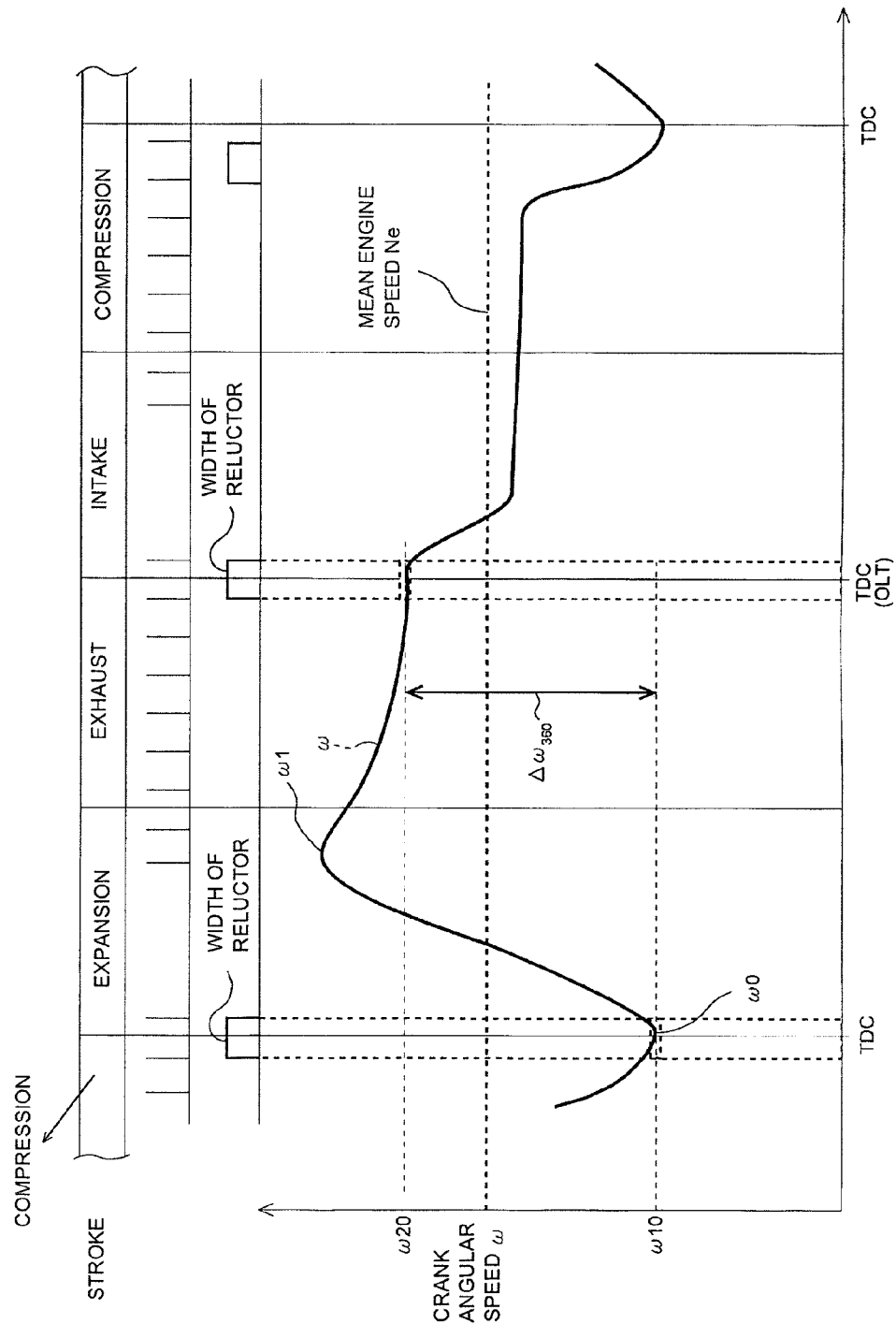
FIG. 10 is a time chart showing the relationship between the crank pulse and the variation in the crank angular speed co in an example set so that the crank pulse associated with the single reluctor is outputted at a position throughout a compression top dead center and an overlap top dead center.

FIG. 10 is a time chart showing the relationship between the crank pulse and the variation in the crank angular speed ω in one cycle. FIG. 10 is a diagram showing an example of setting the position of the crank pulser rotor 2 so that two crank pulses extend over the compression top dead center TDC or the overlap top dead center OLT. In the example shown in FIG. 10, the first crank angular speed ω10 is a value substantially equivalent to the minimum crank angular speed ω0.

By considering the rapid decrease of the crank angular speed ω just after transition from the exhaust stroke to the intake stroke, the crank angular speed ω is preferably acquired just before than just after the compression top dead center TDC or just before than just after the overlap top dead center OLT.

Further, the variation Δω in the crank angular speed is proportionate to the indicated mean effective pressure IMEP, but the indicated mean effective pressure IMEP is generally associated with only a positive work by combustion defined from the compression stroke section to the expansion stroke section. If the indicated mean effective pressure associated with only the positive work is the indicated mean effective pressure $IMEP_{GROSS}$, when the same reluctor is used, it is considered that the angular speed variation $\Delta\omega_{360}$ is proportionate to the indicated mean effective pressure $IMEP_{NET}$ considering a work in one cycle of the engine as well as the expansion stroke. Accordingly, applicants of the present invention experimented and examined the correlation between the angular speed variation $\Delta\omega_{360}$ in one cycle of the engine and the indicated mean effective pressure $IMEP_{NET}$ dealing with an indicated work throughout one cycle.

Figure 11:
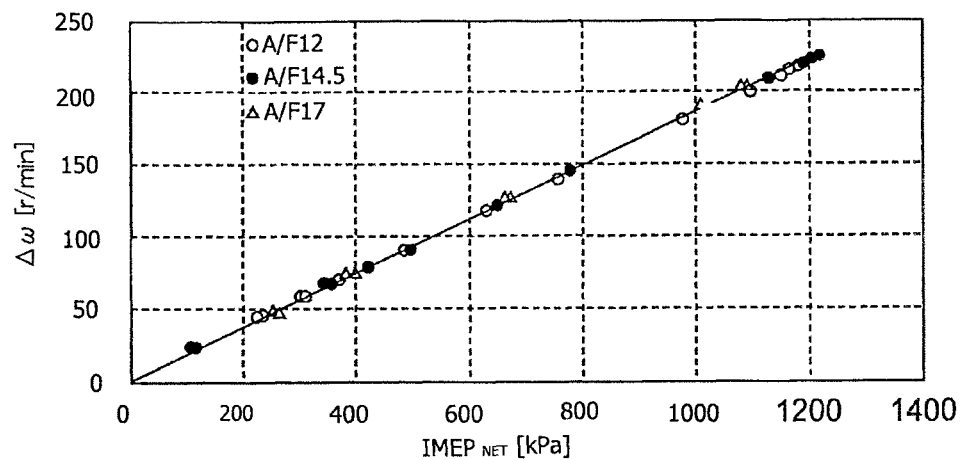
FIG. 11 is a diagram showing an experimental result of the correlation between a crank angular speed variation using an air-fuel ratio as a parameter and an indicated mean effective pressure dealing with an indicated work throughout one cycle.

FIG. 11 is a diagram showing an experimental result of the correlation between a crank angular speed variation $\Delta\omega_{360}$ using an air-fuel ratio A/F as a parameter and an indicated mean effective pressure $IMEP_{NET}$ dealing with an indicated work throughout one cycle. Further, it is assumed that the engine rotates at a predetermined speed.

Figure 12:
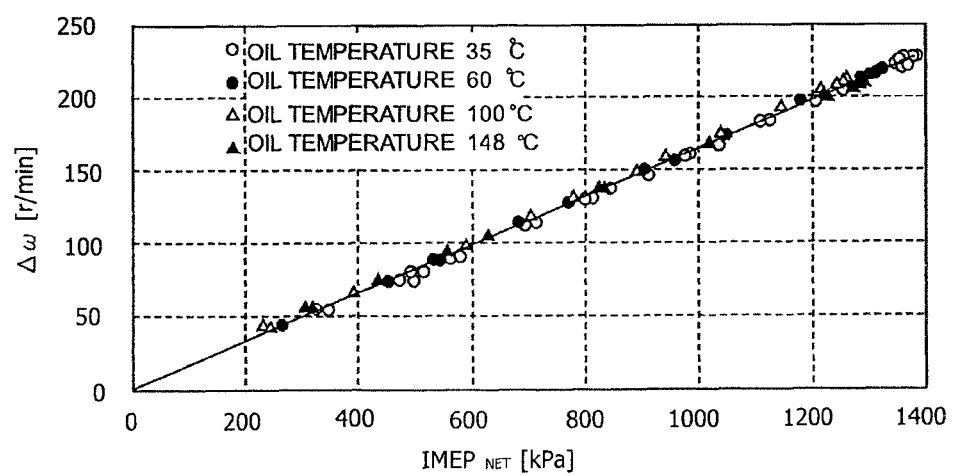
FIG. 12 is a diagram showing an experimental result of the correlation between a crank angular speed variation using an engine lubricant temperature as a parameter and the indicated mean effective pressure dealing with the indicated work throughout one cycle.

FIG. 12 is a diagram showing an experimental result of the correlation between a crank angular speed variation $\Delta\omega_{360}$ using an engine lubricant temperature as a parameter and an indicated mean effective pressure $IMEP_{NET}$ dealing with an indicated work throughout one cycle. Further, it is assumed that the engine rotates at a predetermined speed.

As seen from the experimental results shown in FIGS. 11 and 12, it is verified that the correlation between the crank angular speed variation $\Delta\omega_{360}$ in one cycle and the indicated mean effective pressure $IMEP_{NET}$ is constant irrespective of the air-fuel ratio A/F or the engine lubricant temperature. From this point of view, it is verified that the crank angular speed variation $\Delta\omega_{360}$ has the correlation with the indicated mean effective pressure $IMEP_{NET}$ without depending on the intake air volume or the engine lubricant temperature.

Accordingly, the load of the engine can be estimated by the indicated mean effective pressure $IMEP_{NET}$ which can be acquired by the difference between the first crank angular speed ω10 and the second crank angular speed ω20, i.e., the crank angular speed variation $\Delta\omega_{360}$.

Figure 13:
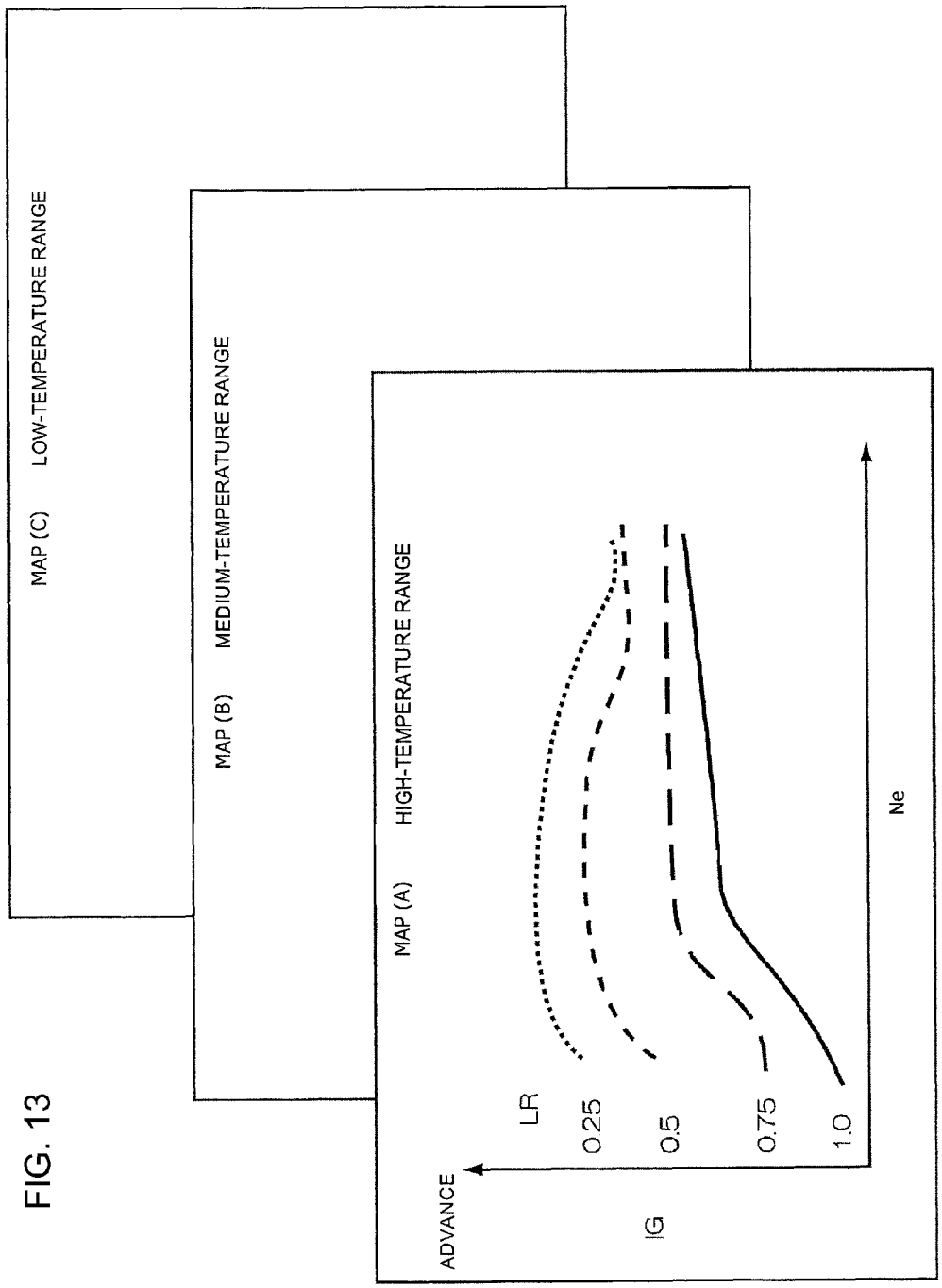
FIG. 13 is a diagram showing one example of an ignition timing search map installed in an ignition timing determining section.

FIG. 13 is a diagram showing one example of an ignition timing search map installed in an ignition timing determining section 414. The map is installed for each engine temperature. In this example, three kinds of maps M(A), M(B), and M(C) of a low-temperature range, a medium-temperature range, and a high-temperature range of the engine are installed, but the classification number of temperature classifications may be set optionally. Each map is set to acquire the ignition timing IG from the engine speed Ne and the load (the indicated mean effective pressure $IMEP_{NET}$ indicating the load).

Further, in that the proportional constants of the load and the indicated mean effective pressure $IMEP_{NET}$ are different from each engine speed Ne, the indicated mean effective pressure $IMEP_{NET}$ is divided by the maximum value, i.e., a value $IMEP_{max}$ under a full load to be defined as the non-dimensionalized load rate LR.

Each map is set so that the ignition timing IG corresponding to the load rate LR is changed to an advance side in the same engine speed Ne as the load rate LR decreases from '1.0'.

As described above, according to the embodiment, the indicated mean effective pressure $IMEP_{NET}$ associated with the load is acquired based on the crank angular speed variation Δω and the ignition timing based on the indicated mean effective pressure $IMEP_{NET}$ is determined. As a result, the ignition timing can be further set to the advance side by verifying the knocking occurrence load range accurately.

Further, although the load is estimated by the indicated mean effective pressure $IMEP_{NET}$ dealing with the work throughout one cycle preferably at the time of using the same reluctor, the present invention can be applied similarly even when the load is estimated by the indicated mean effective pressure $IMEP_{GROSS}$ dealing with only the positive work.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. An ignition timing setting apparatus for an engine, comprising:
   a pulse generator which generates a crank pulse corresponding to a crank angle of the engine during engine operation;
   a crank angular speed variation calculating section which calculates a crank angular speed variation based on an interval of the crank pulse;
   an engine load estimating section which estimates an indicated mean effective pressure based on the calculated crank angular speed variation; and
   an ignition timing determining section which determines an ignition advance quantity in accordance with the estimated indicated mean effective pressure and a state of the engine.

2. The ignition timing setting apparatus according to claim 1, further comprising:
   an engine temperature sensor for sensing engine temperature;
   wherein the state of the engine is an engine speed; and
   wherein the ignition timing determining section is configured to receive an engine operating temperature sensed by the engine temperature sensor, and to have an ignition timing control map stored for each of a plurality of engine operating temperatures so as to search ignition timing based on the engine speed and the estimated indicated mean effective pressure for the sensed engine operating temperature.

3. The ignition timing setting apparatus according to claim 2, wherein the crank angular speed variation calculating section is configured:
   to calculate a first crank angular speed based on a crank pulse around a compression top dead center of the engine,
   to calculate a second crank angular speed based on a crank pulse around an expansion bottom dead center of the engine, and
   to calculate the crank angular speed variation by subtracting the first crank angular speed from the second crank angular speed.

4. The ignition timing setting apparatus according to claim 2,
   wherein said engine comprises a crankshaft, a rotor that rotates in synchronization with said crankshaft of the engine, and a reluctor that protrudes in an outer circumferential direction from said rotor;
   wherein:
   the pulse generator detects proximity of the reluctor to generate the crank pulse; and
   the crank angular speed variation calculating section is configured:
      to calculate a first crank angular speed based on the crank pulse around the compression top dead center of the engine,
      to calculate a second crank angular speed around an overlap top dead center based on a crank pulse outputted with respect to the reluctor used for calculating the first crank angular speed, and
      to calculate the crank angular speed variation by subtracting the first crank angular speed from the second crank angular speed.

5. The ignition timing setting apparatus according to claim 2, wherein the ignition timing control map is configured to search the ignition timing from an engine load rate determined by dividing the estimated indicated mean effective pressure by a predetermined indicated mean effective pressure at a full load and respective engine speed.

6. The ignition timing setting apparatus according to claim 1, wherein the crank angular speed variation calculating section is configured:
   to calculate a first crank angular speed based on a crank pulse around a compression top dead center of the engine,
   to calculate a second crank angular speed based on a crank pulse around an expansion bottom dead center of the engine, and
   to calculate the crank angular speed variation by subtracting the first crank angular speed from the second crank angular speed.

7. The ignition timing setting apparatus according to claim 6, wherein the engine load estimating section is operable to estimate the indicated mean effective pressure indicating an engine load dealing with only an indicated positive work generated from a compression stroke to an expansion stroke of the engine.

8. The ignition timing setting apparatus according to claim 7, wherein the engine load estimating section is operable to estimate an indicated mean effective pressure indicating the engine load dealing with an indicated work throughout one cycle of the engine.

9. The ignition timing setting apparatus according to claim 1, wherein said engine comprises a crankshaft, a rotor that rotates in synchronization with said crankshaft, and a reluctor that protrudes in an outer circumferential direction from said rotor;
   wherein:
   the pulse generator detects proximity of the reluctor to generate the crank pulse; and
   the crank angular speed variation calculating section is configured:
      to calculate a first crank angular speed based on the crank pulse around the compression top dead center of the engine,
      to calculate a second crank angular speed around an overlap top dead center based on a crank pulse outputted with respect to the reluctor used for calculating the first crank angular speed, and
      to calculate the crank angular speed variation by subtracting the first crank angular speed from the second crank angular speed.

10. An engine control apparatus for an engine including an ignition device, said engine control apparatus comprising
   a pulse generator which generates a crank pulse corresponding to a crank angle of the engine;
   an angular speed calculating section, which receives input signals from said pulse generator, and which calculates a first crank angular speed and a second crank angular speed based on the length of time of sensed signal received from the pulse generator;
   crank angular speed variation calculating section which calculates a crank angular speed variation between the first crank angular speed and the second crank angular speed;
   an engine load estimating section which estimates an indicated mean effective pressure from the crank angular speed variation;
   an engine temperature sensor for sensing engine temperaure;
   an ignition timing determining section which determines an ignition timing advance quantity based the estimated indicated mean effective pressure, an engine temperature received from the engine temperature sensor, and an engine speed; and an ignition device driver which receives signals from said ignition timing determining section, and which provides an ignition timing signal to an ignition device of the engine.

11. An engine control apparatus according to claim 10, wherein the ignition timing determining section includes an ignition timing control map set for each engine temperature for searching ignition timing based on the engine speed and the estimated indicated mean effective pressure.

12. An engine control apparatus according to claim 11, wherein the crank angular speed variation calculating section calculates the crank angular speed variation by subtracting the first crank angular speed from the second crank angular speed.

13. An engine control apparatus according to claim 10, wherein the crank angular speed variation calculating section calculates the crank angular speed variation by subtracting the first crank angular speed from the second crank angular speed.

14. An engine control apparatus according to claim 10, wherein the engine load estimating section is operable to estimate the indicated mean effective pressure for an indicated work throughout one cycle of the engine.

15. An engine control apparatus according to claim 10, wherein an angular speed calculating section calculates said first crank angular speed at a compression top dead center of the engine and said second crank angular speed at a position where the crankshaft rotates 360° from the compression top dead center.

16. An engine control unit operatively connected with a plurality of sensors which monitor operation parameters of an engine, said plurality of sensors comprising a pulse generator which generates a crank pulse corresponding to a crank angle of the engine, and an engine temperature sensor which senses an operating temperature of the engine, said engine control unit comprising:
a crank angular speed variation calculating section which calculates a crank angular speed variation based on an interval of the crank pulse;

an engine load estimating section which estimates an indicated mean effective pressure from the crank angular speed variation; and an ignition timing determining section which determines an ignition advance quantity in accordance with the estimated indicated mean effective pressure and sensed temperature of the engine.

17. An engine control unit according to claim 16, wherein the ignition timing determining section includes an ignition timing control map set for various engine temperatures, and is configured to search ignition timing based on an engine speed and the estimated indicated mean effective pressure.

18. An engine control unit according to claim 17, wherein the crank angular speed variation calculating section is configured:
to calculate a first crank angular speed based on a crank pulse around a compression top dead center of the engine,
to calculate a second crank angular speed based on a crank pulse around an expansion bottom dead center of the engine, and
to calculate the crank angular speed variation by subtracting the first crank angular speed from the second crank angular speed.

19. An engine control unit according to claim 16, wherein the crank angular speed variation calculating section is configured:
to calculate a first crank angular speed based on a crank pulse around a compression top dead center of the engine,
to calculate a second crank angular speed based on a crank pulse around an expansion bottom dead center of the engine, and
to calculate the crank angular speed variation by subtracting the first crank angular speed from the second crank angular speed.

20. An engine control unit according to claim 16, wherein the engine load estimating section estimates the indicated mean effective pressure generated from a compression stroke to an expansion stroke of the engine.

* * * * *